(12) United States Patent (10) Patent No.: US 8,575,776 B2
Booth et al. (45) Date of Patent: Nov. 5, 2013

(54) WIND TURBINE WITH A GENERATOR

(75) Inventors: James Kenneth Booth, Brande (DK);
Uffe Eriksen, Horsens (DK); Jacob Blach Nielsen, Engesvang (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 17 days.

(21) Appl. No.: 13/403,219

(22) Filed: Feb. 23, 2012

(65) Prior Publication Data
US 2012/0217752 A1 Aug. 30, 2012

(30) Foreign Application Priority Data

Feb. 25, 2011 (EP) ...................................... 11156047

(51) Int. Cl.
*F03D 9/00* (2006.01)
(52) U.S. Cl.
USPC .......................................................... 290/55

(58) Field of Classification Search
USPC ....................... 290/54–55, 44; 416/244 R, 61
See application file for complete search history.

(56) References Cited

U.S. PATENT DOCUMENTS 7,431,567 B1 * 10/2008 Bevington et al. ......... 416/244 R
7,884,493 B2 * 2/2011 Buskirk et al. .................. 290/55

FOREIGN PATENT DOCUMENTS

| EP | 1641101 A1 | 3/2006 |
| WO | WO 0121956 A1 | 3/2001 |
| WO | WO 2005103489 A2 | 11/2005 |
| WO | WO 2010142759 A1 | 12/2010 |

* cited by examiner

*Primary Examiner* — Jean F Duverne

(57) ABSTRACT

A wind turbine with a generator includes a rotor with permanent magnets and a stator with stator coils mounted on a stator support structure. The stator support structure includes a base structure on which circular connection structures are mounted with their inner perimeter, whereby a stator base structure is connected to the outer perimeter of the circular connection structures.

7 Claims, 2 Drawing Sheets

WIND TURBINE WITH A GENERATOR

CROSS REFERENCE TO RELATED APPLICATIONS

This application claims priority of European Patent Office application No. 11156047.0 EP filed Feb. 25, 2011. All of the applications are incorporated by reference herein in their entirety.

FIELD OF INVENTION

The present invention relates to a wind turbine with a generator, comprising a rotor with permanent magnets and a stator with stator coils mounted on a stator support structure.

BACKGROUND OF INVENTION

In U.S. Pat. No. 7,431,567 B1 a wind turbine with a direct-drive drivetrain is proposed. The wind turbine comprises an electrical generator that includes a rotor assembly. A wind rotor with a hub is directly coupled to the rotor assembly, the wind rotor and the generator rotor assembly are rotatably mounted on a central stationary frame.

Typically a direct-drive wind turbine comprises a generator with an outer rotor. During the design of a direct-drive wind turbine it has to be borne in mind that high forces such as torsion are acting on the structure, in particular on the stator support structure, therefore it is important that the stator support structure is very rigid. Further it is desirable that the stator support structure is easy to mantle and dismantle in order to facilitate maintenance and repair work.

SUMMARY OF INVENTION

It is therefore an object of the present invention to provide a wind turbine with a generator with a rigid stator support structure.

According to the present invention this object is achieved in the above defined wind turbine in that the stator support structure comprises a base structure on which circular connection structures are mounted with their inner perimeter, whereby a stator base structure is connected to the outer perimeter of the circular connection structures.

The invention is based on the idea that an advantageous mechanical stator structure can be obtained when the stator support structure consists of said components, which can be assembled easily and which calm a very rigid and stable stator support structure. The stator support structure of the inventive wind turbine with a generator comprises a base structure which renders the base structure particularly stable. On the base structure connection structures are mounted with a circular shape which lie in a radial plane of the wind turbine. On the opposite side of the connection structures, at their outer perimeter, the stator base structure is mounted. Accordingly the stator support structure is very rigid and able to withstand all forces during operation of the inventive wind turbine.

The base structure of the inventive wind turbine may comprise radially protruding flanges on which the connection structures are mounted.

In the inventive wind turbine it is preferred that the base structure comprises at least two outer flanges for connecting circular connection structures. Accordingly the connection structures are spaced apart in a predetermined distance so that a hollow chamber is formed within the stator support structure.

According to a further development of the inventive wind turbine the base structure may comprise further connection flanges at its axial ends for connecting to a hub or a bearing assembly. On the opposite side the further connection flange may be used for connection to a stationary frame of the wind turbine. It is advantageous that the connection flange can be realised without increasing the mass substantially.

In the inventive wind turbine it may be envisaged that the circular connection structures are connected to the base structure and/or the stator base structure by bolted connections. Such a connection can be mounted easily and it is advantageous that the stator base structure, which may be segmented, may be disassembled and removed in segments, if necessary.

According to an alternative embodiment of the inventive wind turbine the circular connection structures may be connected to the base structure and/or the stator base structure by welding. Welding can be performed relatively fast and produces a connection with a high quality.

As mentioned above the base structure, the circular connection structures and the stator base structure may form a hollow chamber, which may be ventilated so that a cooling is provided for the stator coils disposed on the stator base structure.

The invention and its underlying principle will be better understood when consideration is given to the following detailed description of a preferred embodiment.

DETAILED DESCRIPTION OF INVENTION

Figure 1:
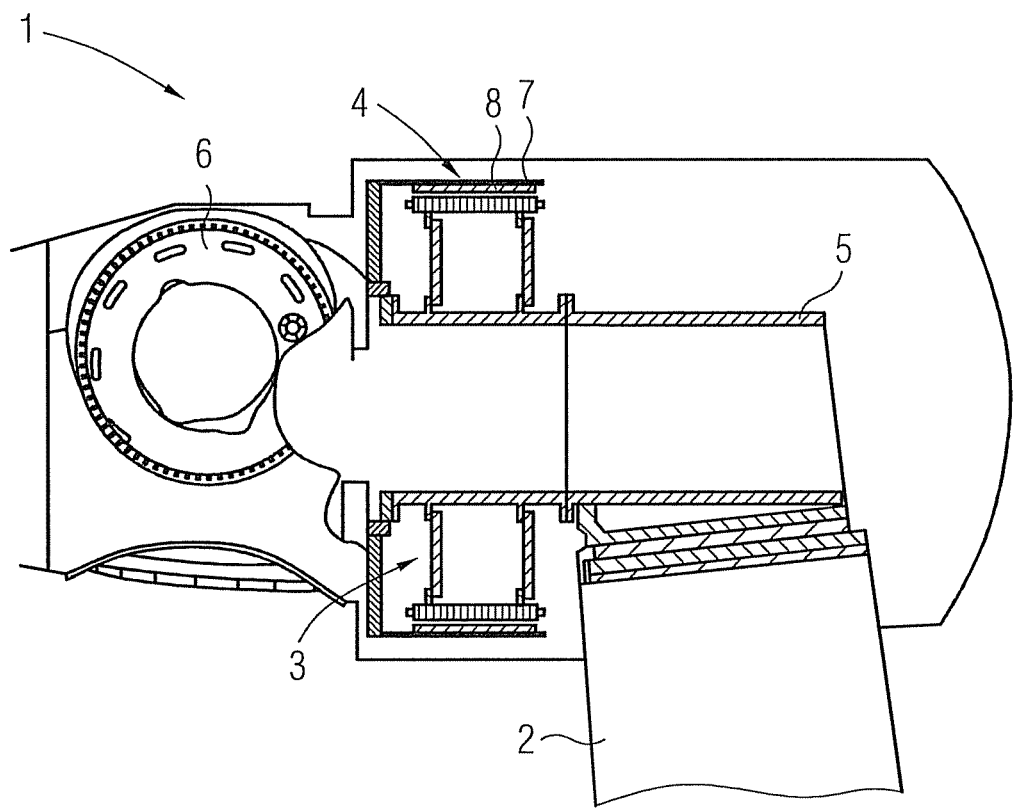
FIG. 1 is a schematic sectional view of a generator of an inventive wind turbine.

FIG. 1 shows the nacelle 1 of the wind turbine in a sectional view. A wind turbine tower 2 (partly depicted) is connected to a stator 3 of a generator 4 via a "swan neck" frame 5. The frame 5 is rotatably mounted on the wind turbine tower 2. A hub 6 is connected to the other side of the stator 3.

Generator 4 is of the direct-drive type with an outer rotor 7 and an inner stator 3, whereby the hub 6 is directly connected to rotor permanent magnets 8.

Figure 2:
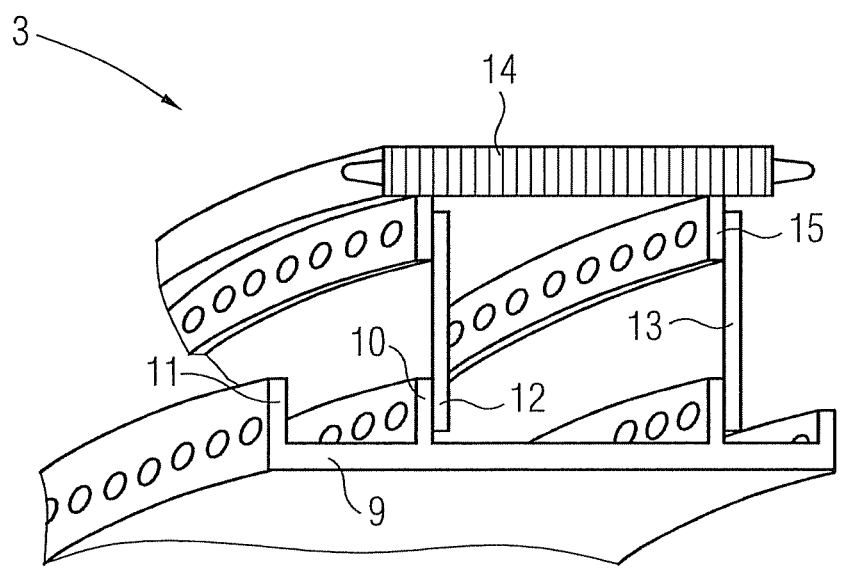
FIG. 2 is a perspective view of the stator in an enlarged scale.

FIG. 2 shows the stator 3 in a perspective view. Stator 3 comprises a base structure 9 which is formed as a circular ring and provided with radially extending connection flanges 10, 11. The base structure 9 comprises two (inner) protruding flanges 10 and two outer connection flanges 11. On the inner protruding flanges 10 circular connection structures 12, 13 are mounted. The connection structure 12, 13 are circular rings which are connected to the protruding flanges 10 by nuts and bolts. Accordingly flanges 10 and connection structures 12, 13 are provided with bolts in circumferential direction. The opposite, outer perimeter of the connection structures 12, 13 is as well provided with holes disposed circumferentially for being connected to the stator base structure 14. Stator coils are mounted on the stator base structure 14 which further comprises flanges 15 which are connected to the connection structures 12, 13. In other embodiments the connection between connection structures 12, 13, base structure 9 and stator base structure 14 can alternatively be effected by welding.

As can be seen in FIG. 2 the stator 3 forms a hollow chamber which exhibits high stiffness so that the stator 3 is able to withstand all forces acting during operation of the wind turbine. Due to the fact that a hollow chamber is formed the inner space can be ventilated in order to cool the stator base structure 14 and the stator coils. When a current is induced in the stator coils during rotation of the rotor, the stator base structure is heated up and the ventilation cools the stator base structure 14 and other components as electrical leads so that their life-time is extended.

The bolted connection as shown in FIG. 2 is advantageous because it ensures that the stator 3 can be disassembled and removed, if necessary. The stator base structure 14 is segmented so that one stator segment can be removed without removing the whole stator 3.

Figure 3:
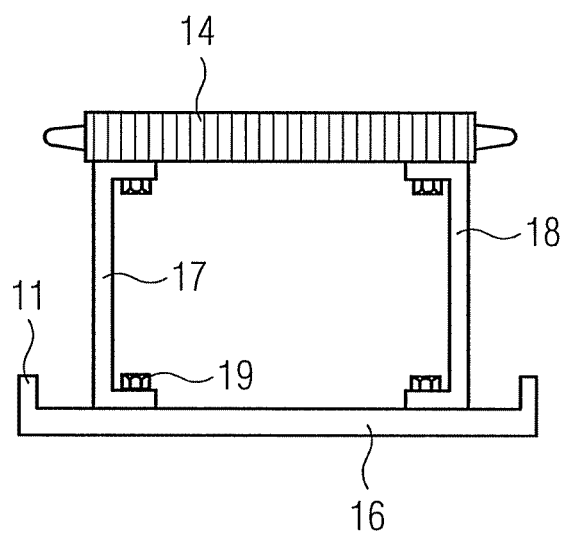
FIG. 3 another embodiment of a stator of an inventive wind turbine.

FIG. 3 shows another embodiment of a stator of a wind turbine. In the sectional view one can see that a base structure 16 with outer connection flanges 11 is used. In contrast to the first embodiment no inner protruding flanges are present, instead connection structures 17, 18 are used which are C-shaped and fixed to the base structure 16 by bolted connections 19. The opposite ends of the connection structures 17, 18 are connected to the stator base structure 14.

The invention claimed is:

1. A wind turbine with a generator, comprising:
   a rotor comprising permanent magnets and arranged around an axis of rotation;
   a stator arranged radially inward from the rotor, the stator comprising:
   stator coils;
   a circular inner base structure;
   a circular outer base structure on which the stator coils are mounted; and
   a plurality of connection structures, each of the plurality of connection structures separated axially and radially extending between the circular inner base structure and the circular outer base structure forming a hollow chamber between the circular inner base structure, outer base structure and the plurality of connection structures,
   wherein the hollow chamber is ventilated, and
   wherein the plurality of connection structures are connected to the circular inner base structure and connected to the circular outer base structure.

2. The wind turbine according to claim 1, wherein the inner base structure comprises radially protruding flanges on which the connection structures are mounted.

3. The wind turbine according to claim 2, wherein the plurality of connection structures are circular.

4. The wind turbine according to claim 2, a hub; and a bearing assembly, wherein the circular inner base structure comprises further connection flanges at axial ends of the circular inner base structure for connecting to the hub or the bearing assembly.

5. The wind turbine according to claim 1, wherein the plurality of connection structures are connected to the circular inner base structure and/or the circular outer base structure by bolted connections.

6. The wind turbine according to claim 1, wherein the plurality of connection structures are connected to the circular inner base structure and/or the circular outer base structure by welding.

7. The wind turbine according to claim 1, wherein the plurality of connection structures are connected to the circular inner base structure such that each of the plurality of connection structures are parallel.

* * * * *